Patented Nov. 15, 1938

2,136,868

UNITED STATES PATENT OFFICE 2,136,868

INSECTICIDE AND METHOD OF MAKING SAME

Herbert Schotte and Karl Görnitz, Berlin, Germany, assignors to Schering-Kahlbaum A. G., Berlin, Germany No Drawing. Application December 12, 1933, Serial No. 702,026. In Germany June 30, 1932

7 Claims. (Cl. 167—24)

Our invention relates to insecticides, more especially of vegetable origin, and has for its purpose to provide means whereby such insecticides can be rendered more efficient.

As is well known to those skilled in the art, difficulties are encountered in the direct conversion of insecticidal drugs into plant-protective agents capable of being dusted and/or sprayed onto the plants, since the vegetable constituents of the drugs retain a considerable part of the effective compounds in the drug, which are therefore not utilized to their full extent. In order to remedy this drawback one has frequently resorted to extraction, which is however connected with considerable extra costs.

We have now found that the effective constituents of roots, rhizomes, wood, green parts of plants, leaves, blossoms and seeds can be freed from the vegetable matter adhering to them and, if desired, can be finely distributed in suitable carrier substances by mixing them with molten substances solidifying on cooling. In accordance with the kind and constitution of the insecticides they may be mixed with molten aliphatic alicyclic or cyclic hydrocarbons, terpenes, inorganic salts, such as crystallized sodium acetate or sodium sulfate, or mixtures of such substances.

Apart from the increase in efficiency thus obtained, the invention also offers important physical advantages, since the products thus obtained possess particularly good adhesive properties and, if suspended in water, can be easily sprayed without any change in composition, since the finely distributed substances will remain floating in the liquid.

The insecticides such as obtained according to the present invention may also be combined with other insecticidal substances, such as arsenic compounds, or with fungicides, such as copper compounds, and with adhesives, such as lime-soaps, or fillers, such as talc, alumina, china clay, bole and the like. When using them for spraying purposes we have found it useful to add Turkey red oil or other salts of sulfonic acids.

In practising our invention we may for instance proceed as follows:

Example 1

Finely distributed tobacco powder is introduced into an equal quantity by weight of molten sodium acetate, until the temperature of the mixture has risen to about 110° C. The solidified mass is powdered and can now be used for strewing or spraying purposes.

Comparative tests with plant lice gave the following results:

| Test 1 | Test 2 |
|---|---|
| 1 tobacco powder : 10H$_2$O | Mixture of 90% sodium acetate and 10% tobacco powder |
| Dead........................ 22 | Dead........................ 143 |
| Alive....................... 106 | Alive....................... 1 |
| 128 | 144 |

Thus Test 1 (pure tobacco powder) resulted in 17%, Test 2 (mixture of sodium acetate and tobacco powder) in 100% killed plant lice.

Example 2

Derris root is mixed with molten naphthol in the proportion of 3:5 and the solid mixture is ground with a suitable diluting agent, such as talc. The product is highly efficient against caterpillars and possesses also fungicidal properties.

Comparative tests each made with 50 caterpillars liparis monacha (5th stage), 20 kgs. being distributed on 2.5 acres, gave the following results:

A. *Mixture of 80% of an inert powder and 20% derris root*

| | After 7 days | After 8 days | Feeding condition |
|---|---|---|---|
| Test 1, killed.................... | 20 | 30 | Strong |
| Test 2, killed.................... | 22 | 33 | Strong |
| Test 3, killed.................... | 15 | 30 | Strong |

B. *Mixture of 80% of an inert powder and 20% of the derris root-naphthol mixture*

| | | | |
|---|---|---|---|
| Test 4, killed.................... | 32 | 39 | Weak |
| Test 5, killed.................... | 33 | 41 | Not feeding |
| Test 6, killed.................... | 29 | 35 | Weak |

Example 3

25 parts rhizoma veratri were mixed with 60 parts molten crude naphthalene and after solidification the mixture was ground together with alumina. The naphthalene may be replaced with equal success by carbazol, thymol, isothymol or crude anthracene.

Example 4

50 parts asagraea seed and 65 parts molten naphthalene were mixed and diluted with suitable fillers according to the insect to be destroyed.

Comparative tests each with 8 caterpillars panolis flammaea (5th stage), 25 kgs. being distributed per 2.5 acres, gave the following results:

| Test 1 | Test 2 |
|---|---|
| Inert powder containing 15% asagraea | Mixture containing 85% naphthalene and 15% asagraea |
| 1st day, killed 0 | 4 |
| 2nd day, killed 1 | +4 |
| 3rd day, killed +5 | |
| 4th day, killed +2 | |
| killed 8 after 4 days | 8 after 2 days |

Example 5

Pyrethrum blossoms were mixed under short vigorous grinding with ⅓, by weight, molten naphthalene. The efficiency of pyrethrum as insecticide was thereby increased 25%.

Example 6

Equal parts pyrethrum blossoms and derris root were mixed with molten naphthalene in the proportion of 3:5 and the mixture treated further as described with reference to Example 3.

Example 7

Quassia wood was mixed with crystallized borax which was melted and the molten mixture powdered and strewed in the usual manner.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. As an insecticide, a finely divided mixture, solidified from the molten state, of an insecticidal vegetable material and a carrier substance, the said carrier substance being solid at ordinary temperatures, but melting below carbonization temperatures of said vegetable material and in its molten state being capable of extracting the active insecticide from said insecticidal vegetable material.

2. As an insecticide, a finely divided mixture, solidified from the molten state, of an insecticidal vegetable material and an inorganic carrier substance, the said carrier substance being solid at ordinary temperatures, but melting below carbonization temperatures of said vegetable material and in its molten state being capable of extracting the active insecticide from said insecticidal vegetable material.

3. As an insecticide, a finely divided mixture, solidified from the molten state, of an insecticidal vegetable material and an organic carrier substance, the said carrier substance being solid at ordinary temperatures, but melting below carbonization temperatures of said vegetable material and in its molten state being capable of extracting the active insecticide from said insecticidal vegetable material.

4. As an insecticide, a finely divided mixture, solidified from the molten state, of derris root and a carrier substance, the said carrier substance being solid at ordinary temperatures, but melting below carbonization temperatures of derris root and in its molten state being capable of extracting the active principle from said derris root.

5. As an insecticide, a finely divided mixture, solidified from the molten state, of pyrethrum blossoms and a carrier substance, the said carrier substance being solid at ordinary temperatures, but melting below carbonization temperatures of pyrethrum blossoms and in its molten state being capable of extracting the active principle from said pyrethrum blossoms.

6. The method of producing an insecticide of increased potency, comprising mixing an insecticidal vegetable material with a molten carrier substance which is solid at ordinary temperatures, but melts below carbonization temperatures of said vegetable material and which is capable of extracting the active principle from said vegetable material, cooling and comminuting the solidified mixture.

7. As an insecticide, finely distributed naphthalene solidified from the molten state and asagraea seed in said solidified naphthalene.

HERBERT SCHOTTE.
KARL GÖRNITZ.